United States Patent [19]

Avers

[11] Patent Number: 5,788,035
[45] Date of Patent: Aug. 4, 1998

[54] CLUTCH PLATE FOR AUTOMATIC TRANSMISSIONS

[76] Inventor: Wayne M. Avers, 16758 Comstock Dr., Livonia, Mich. 48154

[21] Appl. No.: 756,114

[22] Filed: Nov. 25, 1996

Related U.S. Application Data

[63] Continuation of Ser. No. 360,930, Dec. 21, 1994, abandoned.

[51] Int. Cl.⁶ .................................................. F16D 13/64
[52] U.S. Cl. ........................... 192/30 V; 192/107 M; 192/107 C
[58] Field of Search ..................... 192/70.11, 30 V, 192/107 C, 107 M; 188/73.37, 251 A

[56] References Cited

U.S. PATENT DOCUMENTS

| | | |
|---|---|---|
| 1,881,127 | 10/1932 | Paton et al. . |
| 2,071,788 | 2/1937 | Gillett ................................. 188/72 |
| 2,250,343 | 7/1941 | Zigler ................................. 220/75 |
| 2,928,504 | 3/1960 | Hahn et al. ........................ 188/72 |
| 2,955,677 | 10/1960 | Jones ................................. 188/18 |
| 3,628,353 | 12/1971 | Armstrong . |
| 3,895,693 | 7/1975 | Lucien et al. .................... 188/71.1 |
| 3,973,653 | 8/1976 | Weber et al. .................... 188/218 A |
| 4,022,302 | 5/1977 | Janssen ............................ 188/73.1 |
| 4,126,216 | 11/1978 | Babcock et al. . |
| 4,270,645 | 6/1981 | Beccaris ........................... 192/106.1 |
| 4,282,962 | 8/1981 | St. John ........................... 192/105 CD |
| 4,475,634 | 10/1984 | Flaim et al. ..................... 188/218 A |
| 4,534,457 | 8/1985 | Eltze et al. ....................... 192/70.2 |
| 4,585,096 | 4/1986 | Bok ................................... 188/73.37 |
| 4,714,146 | 12/1987 | Moroto et al. ................... 192/85 AA |
| 4,741,420 | 5/1988 | Fujito et al. ..................... 192/30 V |
| 4,796,728 | 1/1989 | Kanengieter et al. ........... 188/18 A |
| 4,865,163 | 9/1989 | Kondo ............................... 188/73.37 |
| 4,949,831 | 8/1990 | Ohga et al. ...................... 192/107 C |
| 5,086,899 | 2/1992 | Latsko ............................. 192/88 B |
| 5,099,967 | 3/1992 | Lang ................................. 188/328 |
| 5,168,971 | 12/1992 | Kovac ............................... 192/30 V |
| 5,217,409 | 6/1993 | Dalbiez ............................. 464/68 |
| 5,255,761 | 10/1993 | Zaremsky ......................... 188/71.5 |
| 5,416,962 | 5/1995 | Passarella ........................ 29/173 |
| 5,515,950 | 5/1996 | Kwolek ............................. 188/73.36 |

FOREIGN PATENT DOCUMENTS

| | | |
|---|---|---|
| 58-170919 | 10/1983 | Japan . |
| 2-300530 | 12/1990 | Japan . |

OTHER PUBLICATIONS

"Pre Finish Metals Inc. —The Inside Story", plus descriptive materials, published by Pre Finish Metal Inc., Elk Grove Village, IL, at least as early as 1993.

*Primary Examiner*—Rodney H. Bonck
*Attorney, Agent, or Firm*—Michael Best & Friedrich LLP

[57] ABSTRACT

The multiplate clutch for an automatic transmission includes a composite separator plate that reduces chatter and the frequency of vibrations transmitted through the separator plate. The separator plate includes a first rigid steel member, a second rigid steel member, and a layer of a viscoelastic material bonded between the two rigid members. The separator plate has projections extending from the first and second rigid members and the viscoelastic layer to engage a rotating drum or a splined shaft. Each of the rigid members has a thickness of between 0.010 to 0.090 inches, and the viscoelastic layer has a thickness of between 0.001 to 0.005 inches.

18 Claims, 1 Drawing Sheet

5,788,035

1

CLUTCH PLATE FOR AUTOMATIC TRANSMISSIONS

This is a continuation of application Ser. No. 08/360,930, filed Dec. 21, 1994, entitled CLUTCH PLATE FOR AUTOMATIC TRANSMISSIONS and now abandoned.

BACKGROUND OF THE INVENTION

This invention relates to clutches for use in motor vehicle automatic transmissions. More particularly, this invention relates to separator and friction plates for use in multiplate clutches of automatic transmissions.

Multiplate clutches for automatic transmissions are known in which a plurality of spaced friction plates are disposed between a plurality of spaced separator plates. The separator plates are typically splined to a rotating drum that is interconnected with a particular gear. The friction plates are typically splined to an internal shaft. A hydraulic force application system applies a force to the separator plate-friction plate assembly when the clutch is engaged, thereby causing the separator plates to be pressed against the friction plates. When the separator plates are forced against the friction plates, the internal shaft or drum rotates with the outer rotating drum, thereby transmitting torque from the drum to the internal shaft or drum.

One shortcoming of multiplate automatic transmission clutches is that vibrations, chatter, and other noise are transmitted upon engagement and disengagement of the clutch to the transmission and to the vehicle chassis. These vibrations and noises are sensed by the passengers in the vehicle, thereby increasing the noise level within the vehicle and lessening the driveability of the vehicle.

There are several sources of these undesirable vibrations and noises. One source of noise and vibration is the chatter caused when the clutch is first engaged that is, when the separator plates are first pressed against the friction plates. The metallic sounds of the separator plates may be heard by the vehicle passengers at increased noise levels.

Another source of noise occurs when the clutch is not in use or is idling. The friction plates and the separator plate then contact the clutch drum and/or the central shaft, thereby generating noise.

Another source of chatter occurs because the separator plates and the friction plates do not remain transverse to the internal shaft when the clutch is not engaged, so that a friction plate may become misaligned and strike an adjacent separator plate. These problems tend to be more acute in clutches used in compact automatic transmissions, like those found in small vehicles and in front wheel drive vehicles, due to the small clearance between the separator plates and the friction plates in these vehicles.

SUMMARY OF THE INVENTION

A multiplate clutch for an automatic transmission is disclosed in which a great deal of the chatter found in prior art devices is eliminated, and in which the frequency of the clutch plate is reduced to a frequency that results in less noise and engagement chatter.

In a preferred embodiment of the present invention, the multiplate clutch includes a rotatable internal shaft, a rotatable drum disposed around a portion of the shaft, a plurality of spaced separator plates that rotate with the drum, a plurality of friction plates disposed between two adjacent spaced separator plates, the friction plates rotating with the shaft, and a means for applying a force to cause the separator plates to engage the friction plates.

2

The multiplate clutch according to the present invention has a unique separator plate which reduces chatter and other noise, and which also reduces the frequency of vibrations transmitted through the plate. The noise and vibrational frequencies are reduced by converting mechanical energy into heat energy, and then dissipating the heat into the surrounding fluid of the automatic transmission.

In a preferred embodiment of the present invention, the separator plate includes a first rigid member having a first central opening therein and a first plurality of projections extending from either the outer periphery of the rigid member or its central opening. The separator plate also includes a second rigid member having a second central opening therein that is aligned with the first central opening, and having a second plurality of projections aligned with the first plurality of projections. Disposed between and bonded to the first and second rigid members is a layer of a viscoelastic material having a thickness of between about 0.001 to 0.005 inches, with 0.001 inches being preferred. The viscoelastic material should be capable of withstanding transmission temperatures on the order of 400° Fahrenheit. The first and second rigid materials are preferably made from a metal alloy such as steel. The first and second rigid members each preferably have a thickness of between 0.010 to 0.090 inches.

It is a feature and advantage of the present invention to reduce the level of noise transmitted from a vehicle engine through the transmission.

It is another feature and advantage of the present invention to lessen the chatter in a clutch for an automatic transmission.

It is yet another feature and advantage of the present invention to decrease the frequency of vibrations transmitted through an automatic transmission clutch.

It is yet another feature and advantage of the present invention to reduce the operating noise level of an automatic transmission.

These and other features and advantages of the present invention will be apparent to those skilled in the art from the following detailed description of the preferred embodiment and the drawings, in which:

DETAILED DESCRIPTION OF THE PREFERRED EMBODIMENT

Three multiplate clutches may be used in an automatic transmission for a motor vehicle. A first clutch is for second gear, a second clutch is used for third gear, and a third clutch allows the vehicle to coast. Although each of the clutches is different in some respects, the clutches are similar with respect to their incorporation of the present invention and will be discussed together. Corresponding parts have been given the same numerical designations.

Each of the three clutches has an internal transmission shaft passing therethrough. The shaft is splined, having a plurality of projections extending from the outer surface thereof. The splines engage a member 20 (FIG. 1) so that member 20 rotates with the shaft. A plurality of friction plates 22 are splined to member 20 and rotate with member 20 and shaft 16.

Figure 1:
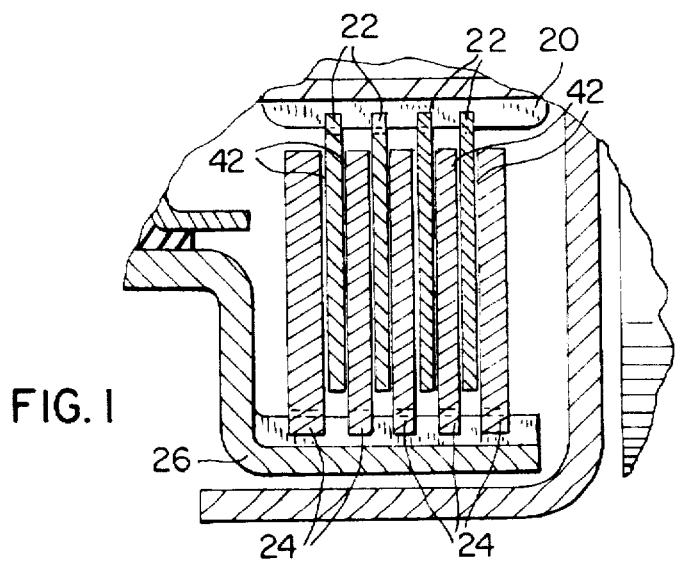
FIG. 1 is an enlarged view of a separator plate-friction plate assembly.

As shown in FIG. 1, each of friction plates 22 is disposed between two adjacent separator plates 24. Separator plates 24 have a plurality of projections disposed on their outer peripheries (see FIG. 2), which projections engage a rotatable drum 26 (FIG. 1). Drum 26 rotates at a particular speed, depending upon the gear with which it is associated.

Figure 2:
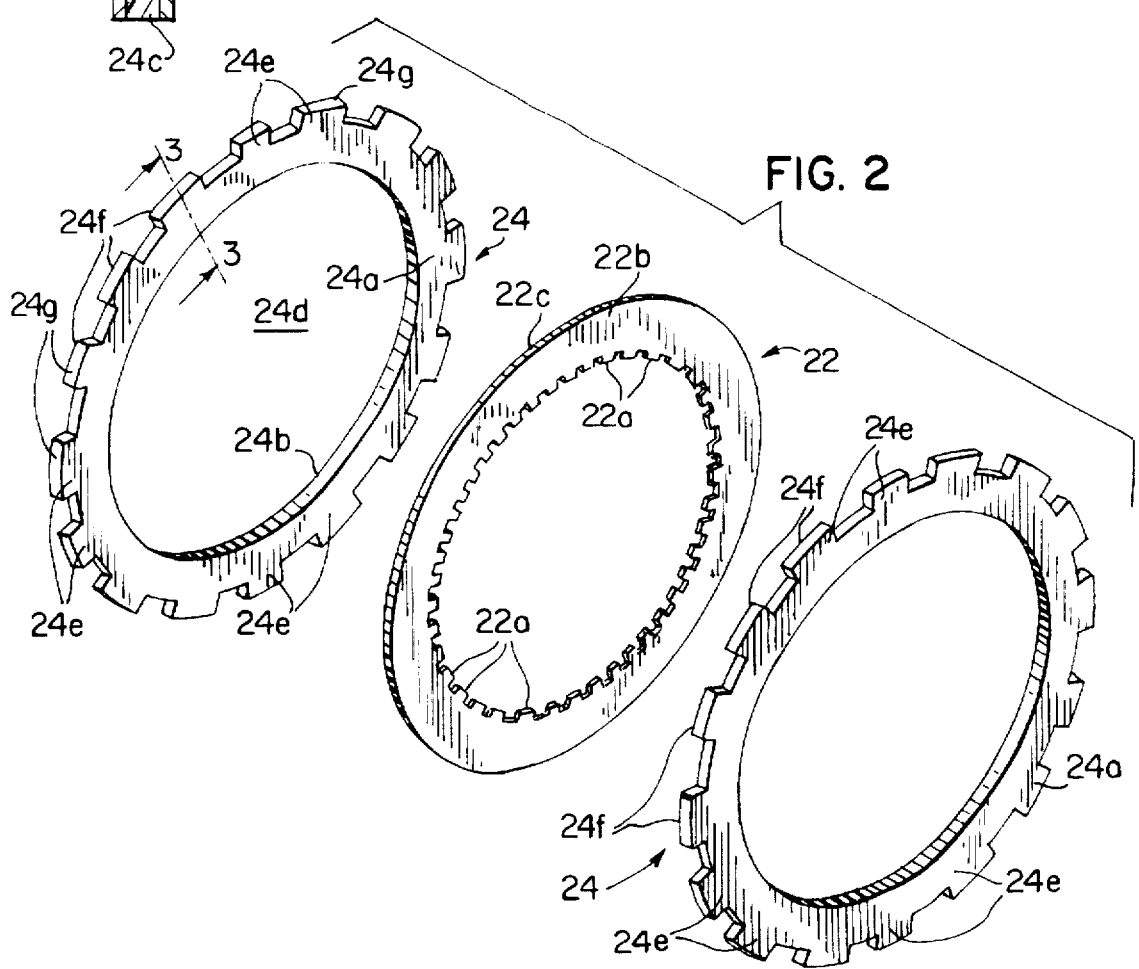
FIG. 2 is an exploded view of a separator plate-friction plate assembly.

Each of friction plates 22 is generally circular and diskshaped, having a central opening therein. In the embodiment of FIGS. 1 and 2, each of the friction plates has spaced projections extending into the central opening for engagement with member 20. Each of the friction plates 22 also has a friction facing material on its opposed side faces for engaging a side surface of an adjacent separator plate 24 when the clutch is engaged.

Although friction plates 22 have projections extended into their respective central openings, and separator plates 24 have projections extending from their respective outer peripheries, this arrangement could be reversed so that the friction plates have projections on their respective outer peripheries and the separator plates have projections extending into their respective central openings.

Each of the first, second and third clutches has a port for receiving a hydraulic fluid, and a ball type check valve disposed within a valve pocket. When a selected clutch is engaged, hydraulic fluid passes through the port, past the valve, through the valve pocket, and into a fluid chamber. A seal seals the fluid chamber.

The pressure of the hydraulic fluid in the fluid chamber forces a piston to move in an axial direction with respect to the shaft, thereby compressing separator plates 24 and friction plates 22 together. Since friction plates 22 rotate with the shaft, and since separator plates 24 rotate with drum 26, the application of a force to compress the friction plates and separator plates of a particular clutch together when the clutch is engaged will result in torque being transmitted from rotating drum 26 to the shaft and thereafter to the wheels of the vehicle.

When the clutch has been disengaged, the pressure of the hydraulic fluid is relieved. Return springs then force the piston to move in an opposite, axial direction, thereby forcing the hydraulic fluid back through the check valve and the port. As a result, the force applied to the friction plate-separator plate combination is relieved, so that separator plates 24 no longer rotate with friction plates 22. As a result, the transmission of torque from drum 26 to the shaft ceases.

All of the three clutches are disposed within an outer transmission housing (not shown) of the automatic transmission. The transmission and clutch components are cooled and lubricated by a transmission fluid within the automatic transmission housing.

FIG. 1 is an exploded view of the friction plate-separator plate assembly of the second clutch discussed above. As depicted in FIG. 1, there are small clearances 42 between friction plates 22 and adjacent separator plates 24. These clearances are on the order of 0.010 to 0.015 inches.

A typical prior art automatic transmission may generate vibrations and chatter noises from several sources. First, the initial application of a force onto separator plates 24 to force the separator plates against the friction plates results in noises as the separator plates slide against the force application plate. Similar chatter noises are generated as the separator plates slip with respect to the friction plates during the initial engagement of the clutch. As previously mentioned, chatter noises also result when the friction plates strike the separator plates when the clutch is disengaged due to misalignments of the friction plates and/or the separator plates.

In addition, vibrations may be transmitted from the engine to the rotating drums, and thereafter to the passenger compartment.

The present invention reduces these noises and the frequency of the vibrations by using a unique separator plate.

Figure 3:
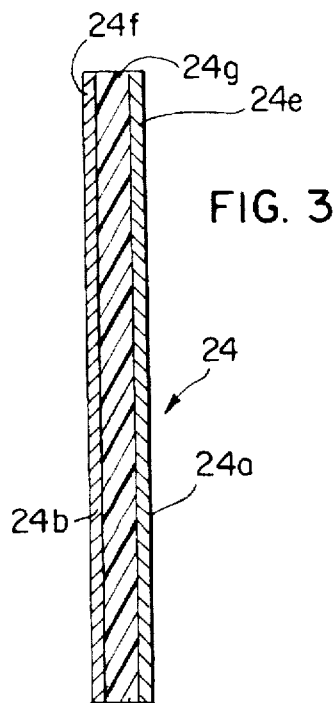
FIG. 3 is a side cross-sectional view of a separator plate, taken along line 3—3 of FIG. 2.

As best shown in FIGS. 2 and 3, separator plate 24 is a composite plate consisting of a first rigid member 24a, a second rigid member 24b, and a viscoelastic layer 24c disposed between and bonded to rigid members 24a and 24b. Rigid members 24a and 24b are preferably made from steel, each having a thickness of between about 0.0475 to 0.052 inches. As best shown in FIG. 2, each of rigid members 24a and 24b is substantially circular in shape, and each has a central opening 24d disposed therethrough. The central openings of rigid members 24a and 24b are aligned with each other.

Rigid member 24a also has a plurality of spaced projections 24e extending from its outer periphery. Similarly, rigid member 24b has a plurality of spaced projections 24f extending from its outer periphery. Projections 24e and 24f are aligned with each other, so that the composite projections may engage drum 26 (FIG. 1).

Sandwiched between rigid members 24a and 24b is a layer 24c of a viscoelastic material. As used herein, the term "viscoelastic material" refers to any material having viscous as well as elastic properties, and particularly such a material which transforms mechanical energy into heat energy. Viscoelastic layer 24c has a thickness of between 0.001 to 0.005 inches, and is bonded to rigid members 24a and 24b by an adhesive, by heating, or by other methods. The viscoelastic material is available from Pre Finish Metals, Inc. of Elk Grove Village, Ill., under the trademark POLYCORE COMPOSITES, type numbers PCX-1 and PCX-9.

As best shown in FIGS. 2 and 3, viscoelastic layer 24c also has a plurality of projections 24g extending from its outer perimeter. Projections 24g are aligned with respective projections 24e of first rigid member 24a, and with projections 24f of second rigid member 24b, to create composite projections, each of which consists of a projection 24e, a projection 24f, and a projection 24g. Although FIGS. 2 and 3 depict the composite projections as being on the outer periphery of separator plate 24, the composite projections may extend from the inner periphery 5 of separator plate 24 into central opening 24d.

In FIG. 2, friction plate 22 has a substantially circular outer periphery, and includes a plurality of spaced projections 22a extending from the inner surface thereof. Friction plate 22 also has a friction facing material on one or both of sides 22b and 22c, for engaging the outermost surfaces of rigid members 24a and 24b.

Rigid members 24a and 24b are preferably made from a high strength/low alloy steel such as a 950 steel. The separator plates are preferably stamped from sheets of composite materials consisting of two layers of steel with the viscoelastic material sandwiched in between.

Although the present invention is preferably used in a separator plate, the invention may also be used with a friction plate in an automatic transmission clutch. The friction plate according to the present invention would have a structure that is similar to friction plate 22, except that the friction plate would be a composite plate comprising a first rigid member, a second rigid member, a viscoelastic layer sandwiched therebetween, and projections extending from each of the rigid members and from the viscoelastic layer, as discussed above in connection with separator plate 24.

While a preferred embodiment of the present invention has been shown and described, alternate embodiments will be apparent to those skilled in the art and are within the intended scope of the present invention. Therefore, the invention is to be limited only by the following claims.

I claim:

1. A plate for use in a clutch of an automatic transmission, said transmission having components that vibrate at a first frequency, comprising:

a first rigid member having a first central opening therein and having a first plurality of projections;

a second rigid member having a second central opening therein, aligned with said first central opening, and having a second plurality of projections aligned with said first plurality of projections; and a layer of a viscoelastic material disposed between said first rigid member and said second rigid member and bonded to form an integral plate with said first rigid member and said second rigid member, said viscoelastic material reducing the frequency of vibrations transmitted through the plate to a second frequency that is less than said first frequency.

2. The plate of claim 1, wherein said first and second rigid members have outer peripheries, and wherein said first plurality of projections and said second plurality of projections are disposed on the outer peripheries of the respective first and second rigid members.

3. The plate of claim 1, wherein said layer of viscoelastic material is bonded to both said first rigid member and said second rigid member.

4. The plate of claim 1, wherein each of said rigid members has a thickness of between 0.010 to 0.090 inches.

5. The plate of claim 1, wherein said layer of viscoelastic material has a thickness of between 0.001 to 0.005 inches.

6. The plate of claim 1, wherein said first and second rigid members are made from a metal alloy.

7. The plate of claim 1, wherein said layer of viscoelastic material also includes a third plurality of projections aligned with both said first plurality of projections and said second plurality of projections.

8. The plate of claim 1, wherein said plate is a clutch separator plate.

9. The plate of claim 1, wherein said plate is a clutch friction plate.

10. A multiplate clutch for an automatic transmission, said transmission having components therein that vibrate a first frequency, comprising:

a rotatable internal shaft;

a rotatable drum disposed around a portion of said shaft;

a plurality of spaced separator plates that rotate with said drum, each of said separator plates comprising:

a first rigid member having a first central opening therein and having a first plurality of projections;

a second rigid member having a second central opening therein aligned with said first central opening and having a second plurality of projections;

a layer of a viscoelastic material disposed between said first rigid member and said second rigid member and bonded to form an integral separator plate with said first and second rigid members, said viscoelastic material reducing the frequency of vibrations transmitted through the separator plate to a second frequency that is less than said first frequency;

at least one friction plate, disposed between two of said spaced separator plates, that rotate with said shaft; and means for applying a force to cause said separator plates to engage said at least one friction plate;

whereby said drum rotates with said shaft when said clutch is engaged.

11. The multiplate clutch of claim 10, wherein said first and second rigid members have outer peripheries, and wherein said first plurality of projections and said second plurality of projections are disposed on the outer 5 peripheries of the respective first and second rigid members.

12. The multiplate clutch of claim 10, wherein said layer of viscoelastic material is bonded to both said first rigid member and said second rigid member.

13. The multiplate clutch of claim 10, wherein each of said rigid members has a thickness of between 0.047 to 0.052 inches.

14. The multiplate clutch of claim 10, wherein said viscoelastic layer has a thickness of between 0.001 to 0.005 inches.

15. The multiplate clutch of claim 10, wherein said viscoelastic layer also includes a third plurality of projections aligned with both said first plurality of projections and said second plurality of projections.

16. The multiplate clutch of claim 10, wherein said first and second rigid members are made from a metal alloy.

17. The multiplate clutch of claim 10, wherein said friction plate has a side surface with a friction material thereon that engages a separator plate.

18. The multiplate clutch of claim 10, wherein said plurality of separator plates includes three spaced separator plates, and wherein said at least one friction plate includes two friction plates, each of said friction plates disposed between two adjacent separator plates.

* * * * *